United States Patent [19]

Harreither

[11] Patent Number: 5,332,378
[45] Date of Patent: Jul. 26, 1994

[54] APPARATUS FOR THE METERED DOSING OF FLOWABLE MASSES

[75] Inventor: Rupert Harreither, Baden, Austria

[73] Assignee: Berndorf Band Gesmbh, Berndorf, Austria

[21] Appl. No.: 854,009

[22] Filed: Mar. 19, 1992

[51] Int. Cl.[5] ............................ B30B 11/20; B01J 2/20
[52] U.S. Cl. .................................... 425/8; 425/331;
425/378.1; 425/DIG. 230; 264/8; 141/131;
141/270
[58] Field of Search .............. 141/129, 131, 144, 236,
141/266; 270, 286, 82; 425/6, 8, 294, 331, 377,
378.1, 379.1, 382.3, DIG. 230; 264/8, 310

[56] References Cited

U.S. PATENT DOCUMENTS

| | | | |
|---|---|---|---|
| 2,639,591 | 5/1953 | Mojonnier | 141/82 |
| 3,234,894 | 2/1966 | Dechert | 425/331 |
| 3,981,664 | 9/1976 | Bittner et al. | 425/331 |
| 4,029,459 | 6/1977 | Schmiedeke | 425/331 X |
| 5,009,586 | 4/1991 | Pallmann | 425/331 X |
| 5,013,498 | 5/1991 | Froeschke | 264/8 |
| 5,186,960 | 2/1993 | Walsh, Jr. | 425/382.3 X |

FOREIGN PATENT DOCUMENTS

| | | |
|---|---|---|
| 0145839 | 6/1985 | European Pat. Off. . |
| 0244849 | 11/1987 | European Pat. Off. . |
| 0303755 | 2/1989 | European Pat. Off. . |
| 0339325 | 11/1989 | European Pat. Off. . |
| 1963754 | 7/1970 | Fed. Rep. of Germany . |
| 1941460 | 3/1971 | Fed. Rep. of Germany . |
| 3891558 | 12/1989 | Fed. Rep. of Germany . |
| 0199198 | 11/1984 | Japan ........................... 425/331 |
| 8706880 | 11/1987 | PCT Int'l Appl. ............ 425/331 |
| 9003839 | 4/1990 | PCT Int'l Appl. ............ 425/331 |
| 105767 | 7/1924 | Switzerland . |
| 763704 | 12/1956 | United Kingdom . |

OTHER PUBLICATIONS

Preliminary Austrian Office Action of Sep. 20, 1990.
European Search Report and Annex, Dec. 17, 1991.
English–Language transition of E.P.O. 0 244 849, Nov. 11, 1987.

Primary Examiner—J. Casimer Jacyna
Attorney, Agent, or Firm—Sandler, Greenblum & Bernstein

[57] ABSTRACT

A metering apparatus for the metered delivery of flowable or fluent material masses comprises a drum member rotatable about a substantially horizontal lengthwise axis. A cylindrical shell of such drum member contains a multiplicity of openings. A cell wheel is rotatably arranged within the drum member. The lengthwise axis of the cell wheel and the lengthwise axis of the drum member are arranged parallel and eccentric to one another and, optionally, these lengthwise axes can be moved relative to one another. Beneath the drum member there is arranged a transport device for receiving metered portions of the material mass. The cell wheel is provided with lamellae cooperating with an inner surface or wall of the drum member, and such drum member, while leaving free or unobstructed a lower region, is surrounded by a container for the material mass.

37 Claims, 4 Drawing Sheets

APPARATUS FOR THE METERED DOSING OF FLOWABLE MASSES

BACKGROUND OF THE INVENTION

1. Field of the Invention

The present invention relates to a new and improved apparatus for the metered dosing of flowable or fluent masses, especially liquidous and pasty material masses.

Generally speaking, the metering apparatus of the present development comprises a rotatable drum member or drum rotatable about a substantially horizontal lengthwise axis. This drum member contains a substantially cylindrical outer shell or jacket provided with a plurality of openings or perforations, especially circular or round openings or perforations. Rotatably arranged within this drum member is a roller member having a lengthwise axis. This lengthwise axis of the roller member and the lengthwise axis of the drum member are arranged substantially parallel and eccentric to one another, and optionally these lengthwise axes can be moved relative to one another. Beneath the drum member there is arranged a transport device or member, for example, an endless transport belt or band, for receiving the metered mass portions, especially mass droplets or globules of the processed material. If desired, these mass droplets or globules can solidify upon the transport device or member.

2. Discussion of the Background and Material Information

The metered dosing or apportionment of material masses, in particular pasty including liquidous masses of materials to be processed usually constitutes one of the last process steps during the manufacture of chemicals, foodstuffs or also pharmaceutical products. Depending upon the encountered requirements, there are prescribed for the manufacturing operation a predetermined shape of the delivered portions of the metered material mass undergoing processing or a predetermined quantity of the delivered dosed portions, or else both such factors are prescribed. The metered or dosed quantities of processed material mass delivered by a corresponding metering apparatus are usually supplied to transport devices, especially endless belts or bands, where the deposited material mass is solidified either by heating or cooling thereof.

During the delivery of the material mass from a rotating drum member, it is desired, both from the standpoint of having a constant volume of the metered material mass portions and a constant dimensional shape or form, to avoid any pre-flow or post-flow of the processed material. Furthermore, there should be possible the attainment of reproducible metered portions of the delivered material mass undergoing processing irrespective of the region of the drum member through which passes the material mass.

In German Patent Publication No. 1,941,460, published Mar. 11, 1971, there is disclosed an apparatus for the droplet-shape delivery of pressable material masses from a vat or container. The metered dosing of the material masses is accomplished by means of a diaphragm. Owing to the reproducible motion of the diaphragm and the thus required construction of the apparatus, there occurs an accumulation of the material or substance to be eliminated between the vat and the diaphragm. Hence, after the expiration of a relatively short amount of service time of the apparatus, it is necessary to perform extensive cleaning of such apparatus in order to ensure that there can be realized an exact metering of the processed material mass.

According to another prior art apparatus as disclosed in German Patent Publication No. 3,819,558, published Dec. 14, 1989, nozzles are provided at the lower region of a heated vat or container. The material mass emerges through such nozzles and is subdivided into individual material droplets by means of a shaped vane. These material droplets then descend onto a cooling band located therebelow. With this prior art apparatus it is not possible to reproduce upon the cooling band either the shape or the quantity of the deposited metered portions of the processed material mass.

In the European Published Patent Application No. 244, 849, published Nov. 11, 1987, constituting a starting point in the consideration of the metering apparatus of the present invention, there is taught a granulation apparatus containing a perforated hollow drum member. The inner surface of this perforated hollow drum member is provided with teeth. The teeth of a drum or roller arranged within such perforated hollow drum member engage with the teeth of this perforated hollow drum member. The material mass to be granulated is introduced into the perforated hollow drum member and, as a result of the rotational movement of such perforated hollow drum member, is introduced into the tooth gaps or spaces of the meshing teeth and from this location is pressed out by the drum or roller entrained by the perforated hollow drum member. If there are used involute teeth, then by adjusting the mutual spacing between the lengthwise axes of these drums it is intended to influence the volume of the spaces enclosed between tooth ledges. An endless belt arranged beneath the granulation apparatus receives the delivered material mass dripping out of the granulation apparatus. Additionally, it is contemplated to achieve a change in the volume of the pressed out material mass droplets by exchanging the drum and tooth ledges situated internally of the perforated hollow drum member.

What is disadvantageous with this type of prior art equipment, is that a volume change of the droplets only is possible within a very small region which is governed by the closed space of the teeth of the perforated hollow drum member and the drum or roller. As a result of this drawback, the quantity of the dripping-out material mass is markedly dependent upon the material mass viscosity, since there occurs a return flow of the material mass through the spaces or gaps of the teeth when the space is not yet closed. Moreover, there practically cannot be avoided pre-dripping and post-dripping of the material mass, since there only can occur to a limited extent a sucking-back of the material mass into the hollow cylinder of the hollow drum member, and specifically, at that region where the spaces between the teeth are closed, and the volume increases due to the rotational movement of the hollow drum member and the internal drum or roller. Additionally, by virtue of the positive driving of either the outer hollow drum member or the inner drum or roller by the other coacting cylindrical member, abrasion occurs at the teeth. As a result thereof, there arises with time, on the one hand, wear and thus a volume change, and, on the other hand, the worn or abraded particles are mixed with the material mass to be pressed out, resulting in an undesired contamination of the obtained product. Of course, these same observations hold true even if, as proposed in such patent document, the teeth are formed of plastic material.

SUMMARY OF THE INVENTION

Therefore, with the foregoing in mind, it is a primary object of the present invention to provide an improved apparatus for the metered dosing of flowable or fluent masses, especially liquidous and pasty material masses, which is not afflicted with the aforementioned limitations and drawbacks of the prior art.

Another and more specific object of the present invention aims at the provision of improved apparatus for the metered dosing of flowable or fluent masses, especially liquidous and pasty material masses, rendering possible an exceedingly constant delivery of metered dosages of the processed material mass, and there can be precluded in a relatively simple and effective fashion a pre-flow and post-flow of the processed material mass.

Still a further noteworthy object of the present invention is the provision of an improved apparatus for the metered dosing of flowable or fluent masses which enables effective accommodation of the apparatus to the quantity of the mass to be metered or dosed into desired portions and optionally to other mass viscosities.

Yet another significant object of the present invention concerns devising an improved apparatus for the metered dosing of flowable or fluent masses, wherein the wear of apparatus parts coming into contact with the processed mass, especially pasty masses, is maintained quite low.

A further notable object of the present invention aims at the provision of an improved apparatus for the metered dosing of flowable or fluent material masses, especially liquidous and pasty material masses, which is relatively simple in construction, exceedingly reliable in operation, relatively economical to manufacture, not readily subject to breakdown or malfunction, and requires comparatively little servicing and maintenance.

Now in order to implement these and still further objects of the present invention, which will become more readily apparent as the description proceeds, the apparatus for the metered dosing of flowable or fluent material masses of the present development is manifested, among other things, by the features that the roller member is constructed as a cell wheel containing lamellae or foils or blades or equivalent structure cooperating with the inner surface or wall of the substantially cylindrical shell or jacket. This inner surface or wall, if desired, likewise can be substantially cylindrical. The drum member is partially encircled or surrounded by a container for the material mass, while leaving free a lower region.

Due to the substantially horizontal arrangement of the rotatable drum member containing the openings or perforations and the roller member arranged in such rotatable drum member, it is possible to relatively easily obtain a substantially uniform distribution of the material mass to be metered or apportioned within the apparatus. By means of the eccentric arrangement of the drum member in relation to the roller member there can be realized a particularly simple volume reduction during the rotational movement occurring between the drum member and the roller member. The endless belt or band can be positioned beneath the drum member for the purpose of receiving the metered or apportioned material mass droplets or globules. This endless belt or band also enables subsequently carrying out lengthier, continuously performed processes, such as, for instance, drying, backing or the like of these material mass droplets or globules. Due to the construction of the roller member as a cell wheel, the lamellae or foils of which coact with the inner cylindrical surface of the substantially cylindrical shell or jacket of the drum member, there can be formed exactly defined volumetric regions or volume spaces which govern the quantity of the apportioned dosages of the material mass droplets or globules.

By virtue of the eccentric mounting of the cell wheel with respect to the perforated shell of the drum member, there can be formed both at the region located internally of the container as well at the region located externally of such container, regions entailing a volume increase and subsequent regions entailing a volume decrease of the space enclosed by the lamellae of the cell wheel and the drum member. During the volume increase within the container filled with the material mass, the material mass to be metered or apportioned is sucked-up into the space between the drum member and the cell wheel. Thereafter, the volume is again decreased and the material mass to be metered is ejected. Consequently, there is ensured complete filling of the space, and thus, an exact metering or apportionment of the material mass.

Upon departure of the region of the drum member in conjunction with the cell wheel externally of the confines of the container, the for instance pasty material mass is indeed further pressed out or extruded, however, there is thus determined the portion of the material mass to be pressed out or extruded, which also is dependent upon the number of openings or perforations present at the drum member along a generatrix. Upon completion of a material mass metering or apportionment operation, there occurs an increase in the volume between the cell wheel and the drum, member, whereby there is particularly effectively prevented post-dripping of the material mass since such material mass is sucked back into the space. After entry of the region into the container there is then again sucked-up material mass which is to be metered or apportioned. By virtue of the lengthwise axes of the cell wheel and the drum member which are to be moved relative to one another, the volume enclosed between the drum member and the cell wheel, and specifically, between the lamellae, can be exactly determined upon departure from the container, and thus, there can be exactly determined the quantity of the pressed-out or extruded material mass.

If the rotatable drum member and the rotatable cell wheel are drivable with the same number of revolutions, then the lamellae of the cell wheel do not overtake the openings or perforations of the drum member in any position of these lamellae. Rather, these lamellae only move in the region between two rows of such openings or perforations, resulting in a particularly accurate metering of the material mass.

If the lamellae or foils or the like are guided in radial slots or grooves, especially radial slots or grooves extending in the direction of generatrixes and elastically held, for instance, by means of springs or resilient elements against the drum member, then, on the one hand, there can be obtained an especially good mobility of the lamellae or foils within the cell wheel and a good sealing action at the drum member, and, on the other hand, an especially small amount of wear. The spring pressure of the lamellae or foils against the inner wall of the drum member also can be achieved pneumatically or hydraulically. When using a hydraulic system there also can be used as the pressurized fluid medium the material mass which is to be metered or apportioned, so that even if leaks are present there does not arise any contamination of the metered material mass by hydraulic fluid medium.

If the spacing or distance between the lengthwise axis of the drum member and the container can be varied in vertical or elevational direction, then as a result there can be determined or defined in a particularly simple manner the departure of a predetermined region of the drum member out of the container, and thus, the volume of the material mass portions or segments. This measure either can be employed alone for altering the volume of the material mass portions to be pressed out or extruded, or there can be altered in vertical direction the spacing of the lengthwise axis of the cell wheel with respect to the container. However, the possibility also exists to separately use both constructional measures.

An especially simple and operationally reliable solution, which also affords an infinite adjustment of the volume of the material mass to be metered or apportioned, can be realized when the drum member and/or the cell wheel are mounted in eccentrics or eccentric mechanisms.

If the eccentric or eccentric mechanism of the cell wheel is mounted in the eccentric or eccentric mechanism of the drum member, then there is realized a constructionally simple solution, which is not only operationally reliable but also exceedingly accurate in performing the metering function.

If the eccentrics are arranged externally of the drum member, then these eccentrics are guarded against contamination in a very simple manner, and the empty volume within the drum member can be maintained particularly large.

If the container is sealed in relation to the drum by member by means of one, especially two sealing or seal members, such as sealing ledges arranged at opposite ends or end regions of the container, then in the lengthwise direction of the drum member there is provided a constructionally simple and positive solution as concerns the simultaneous entry and exit of the openings or perforations of the rotatable drum member.

If with an eccentric arrangement of the lengthwise axes of the drum member and cell wheel with respect to one another, the regions of the increase and/or decrease of the volume or volumetric space enclosed by two neighboring lamellae and the drum member are alterable, then, depending upon requirements, for example the viscosity of the material mass which can be sucked out of the container into the drum member, there can be regulated the time span for sucking-in the material mass, and there can be furthermore also predetermined the quantity of the material mass to be metered which departs from the drum member.

A change of these regions can be constructionally simply obtained by pivoting the container about a lengthwise axis which is substantially parallel to the lengthwise axis of the drum member, or else, the container can be arranged to be displaceable in vertical direction.

A different constructional solution which requires a modest amount of space and for which only small equipment masses must be moved, in order to alter both regions, resides in the fact that at least one, preferably both sealing or seal members of the container can be displaced and/or pivoted along the circumferential direction of the drum member.

If a sealing or seal member is arranged at the entry side of the rotatable drum member, as viewed in the direction of rotation thereof, so as to resiliently bear via a surface at the drum member, especially in tangential direction, then there is possible the use of a sealing or seal member which particularly easily accommodates the mobility of the drum member in vertical direction.

If a shaft member, which defines the lengthwise axis of the cell wheel, contains bores extending in the axial direction of the shaft member, for passage of a tempering, especially heating fluid medium, then there can be reproducibly set the viscosity of the material mass to be metered. Furthermore, as a result of this relatively simple constructional solution there can be avoided any post-flow of the material mass.

If the container is provided with bores or external tubular pipes or conduits for a tempering, especially heating fluid medium, then there can be prevented in a constructionally simple manner a pre-dripping or outflow of the material mass from the container.

If the bores are at least partially interconnected at their ends for flow communication, then there can be avoided the presence of a temperature gradient in axial direction.

If the container and the cell wheel possess the same number of bores, especially having the same cross-section or cross-sectional area, there is rendered possible in a simple manner identical heating capacities in the container and in the cell wheel.

Furthermore, there can be then particularly ensured the same rotational speed of the cell wheel and the container if both such cell wheel and container are powered by the same or con, non drive or drive means.

If the drive of the cell wheel is coupled with the drive of the drum member by means of a sliding sleeve or bushing, by means of which the lengthwise axes of the cell wheel and the drum member are displaceable along slide surfaces disposed normal to one another, then with completely identical drives there can be carried out an eccentric shifting of the lengthwise axes of the cell wheel and the drum member without interfering with the drive.

In the event that the container is sealed at opposite end regions thereof in relation to the drum member by means of labyrinth seals, then there is realized a frictionless or low friction, and thus, disturbance-free seal structure.

If the container is provided with a distributor chamber or space for the material mass, then even with a single infeed of the material mass there can be obtained a substantially uniform distribution of the material mass in the container, and thus, substantially uniform infeed or delivery thereof into the drum member. Furthermore, there is thus ensured an exact metered delivery or outfeed in portions of the material mass.

If the distributor chamber or space is provided in a component or part releasably connected with the container, then, depending upon the viscosity of the material mass to be metered or apportioned, different distributor chambers or spaces can be readily provided for the container.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the apparatus for the metered dosing of flowable or fluent material masses, especially liquidous and pasty material masses, has been depicted therein, in order to simplify the illustration, as needed for those skilled in the art to readily understand the underlying principles and concepts of the present invention.

Figure 1:
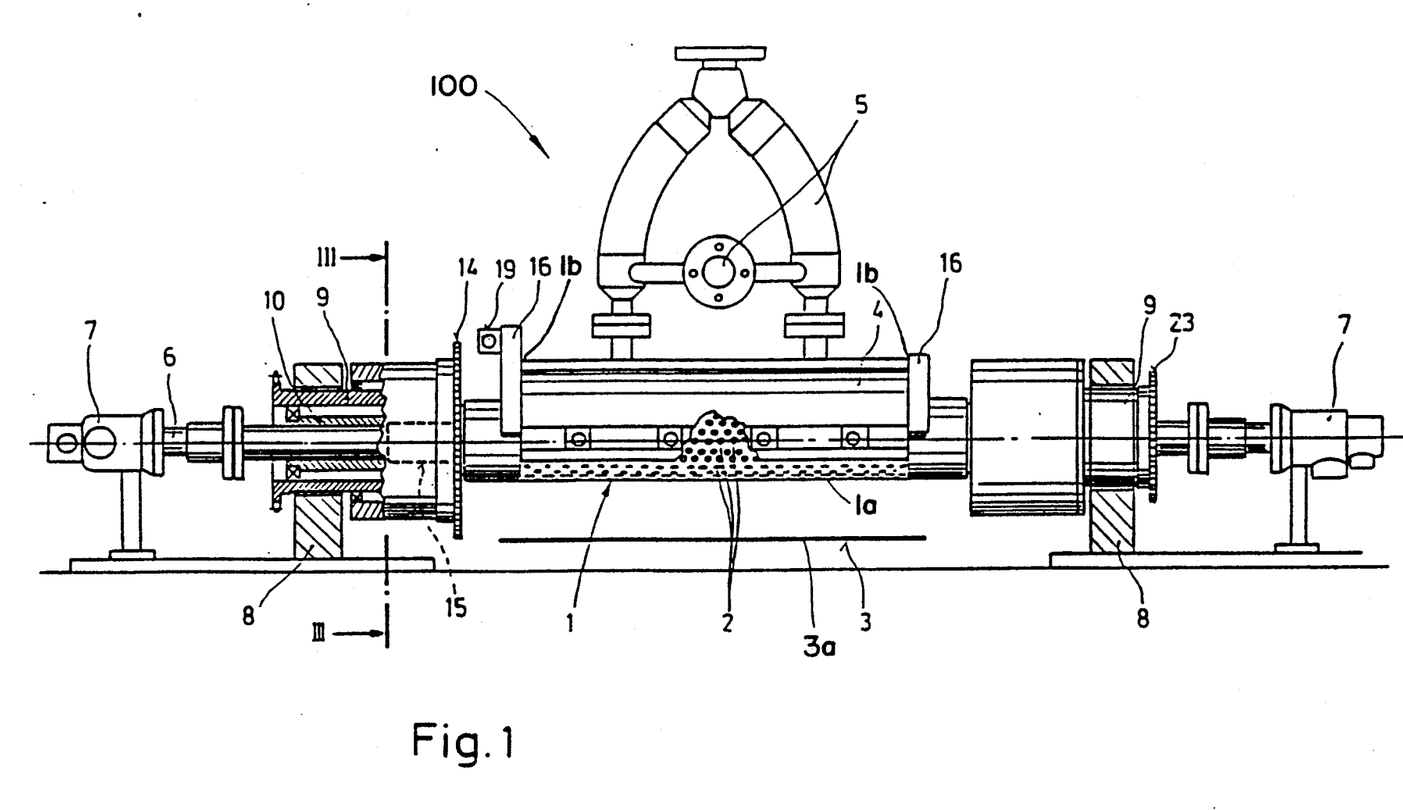
FIG. 1 is a schematic front view, partially in section, of an exemplary embodiment of apparatus for the metered dosing of flowable or fluent material masses according to the present invention.

Turning attention now to the exemplary embodiment of metering apparatus 100 depicted in FIG. 1, it will be recognized that a drum member or drum 1 comprises a substantially cylindrical shell or jacket 1a containing a plurality of, for instance, circular openings or perforations 2. Each of the openings or perforations 2 are arranged along a generatrix of the drum member 1 and extend throughout the entire substantially cylindrical shell or jacket 1a. Beneath the drum member 1 there is arranged a suitable transport device or member 3a, here shown as an endless transport belt or band 3. This transport belt or band 3 receives thereupon and further transports the material mass portions emerging from the drum member 1. This drum member 1 is partially enclosed or encircled by a container or housing 4 which is supplied by supply or delivery conduits or lines 5 with the material mass to be metered from any suitable supply receptacle or other appropriate supply source.

A substantially horizontal shaft member or shaft 6 is journaled in rotary guides 7 or the like. Eccentric sleeve or bushing members 9 of the rotatable drum member 1 and eccentric sleeve or bushing members 10 of a cell wheel 38 are mounted in bearing or pillow blocks 8 or equivalent structure. These eccentric sleeve or bushing members 9 and 10 are here arranged, for instance, externally of the drum member 1, the container 4 and the cell wheel 38.

Figure 2:
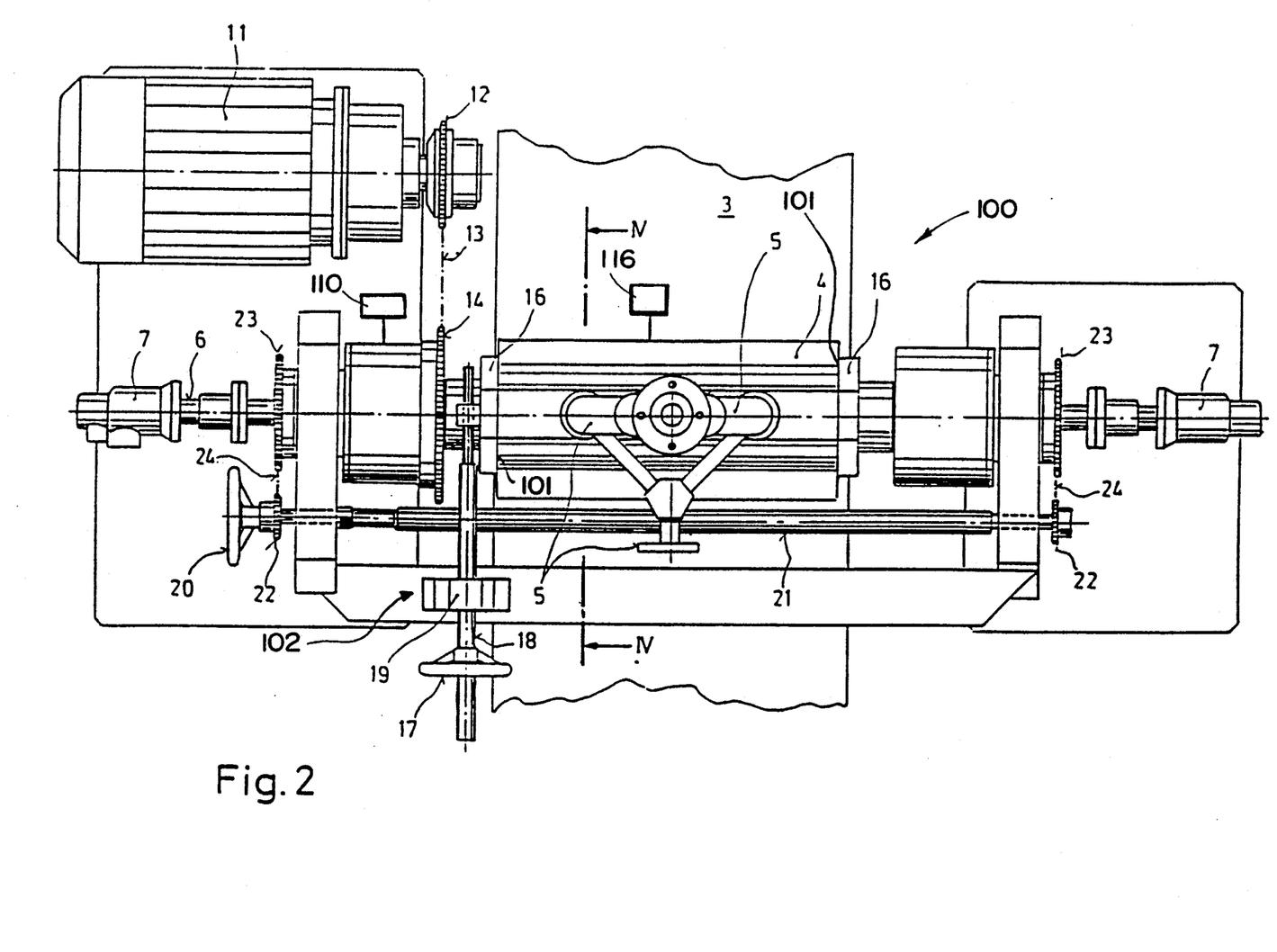
FIG. 2 is a schematic top plan view, partially in section, of the apparatus for the metered dosing of flowable or fluent material masses depicted in FIG. 1.

As will be particularly recognized from the showing of FIG. 2, the drive is accomplished by a suitable drive unit, and specifically, here, for example, by means of an electric motor 11 equipped with gearing. This geared electric motor 11 drives a slide sleeve or bushing 15 by means of a sprocket wheel 12, sprocket chain 13 and sprocket wheel 14. As will be further explained in conjunction with FIG. 3, this slide sleeve or bushing 15 drives both the drum member 1 and the cell wheel 38. The container 4, which in cross-section is of partially cylindrical configuration, is closed at both of its opposite ends or end regions 1b, by closure or cover plates 16 and suitable conventional and thus here merely schematically represented seals 101, such as labyrinth seals.

As particularly depicted in FIG. 2, the container 4 can be pivoted or rocked about a substantially horizontal lengthwise axis, which extends substantially parallel to the not particularly referenced lengthwise axis of the container 4 and to the lengthwise axis 29 of the drum member 1, by means of a pivot mechanism 102, which here, for example, comprises a handwheel 17, spindle member 18 and spindle nut member 19. In FIG. 1 there is only visible the spindle nut member or nut 19. As a result of such pivotable movement of the container 4, and as recognizable from the showing of FIG. 4, the drum member 1 immerses to a greater or lesser extent into the container 4. Also it would be possible to provide an adjustment or displacement mechanism 116 for displacing the container 4 in substantially vertical or elevational direction.

By means of a handwheel 20 provided with a spindle 21 and via sprocket wheels 22 and sprocket chains 24 there can be operated sprocket wheels 23 for initiating a displacement or positional adjustment of the eccentric sleeves 9 of the drum member 1 at both sides or end regions of such drum member 1. Consequently, this drum member 1 can be moved vertically up-and-down within the container 4, in order to selectively change or vary the distance between the lengthwise axis 29 of the drum member 1 and the lengthwise axis of the container 4. An analogous adjustment or displacement mechanism, here, however, merely conveniently generally indicated by reference numeral 110 to simplify the drawing illustration, is provided for the eccentric sleeves 10 of the cell wheel 38, wherein the eccentric sleeve 10 of the cell wheel 38 is mounted within the eccentric sleeve 9 of the drum member 1, so that there is afforded a double-adjustment possibility. Comparable to what has been previously explained, this adjustment or displacement mechanism 110 enables selectively changing or varying the distance between the lengthwise axis 30 of the cell wheel or cell wheel member 38 and the lengthwise axis of the container 4.

Figures 3, 4, 4A:
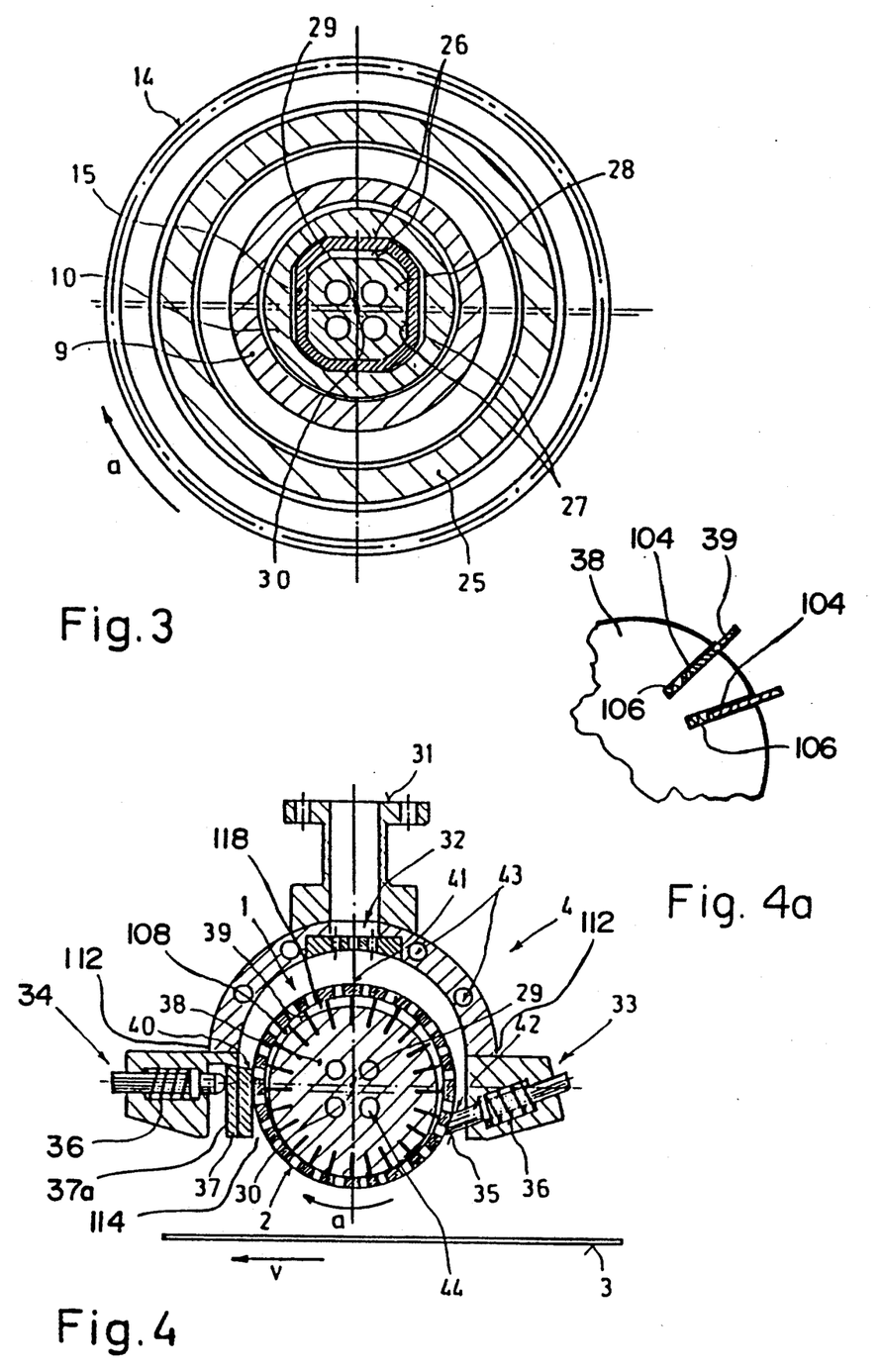
FIG. 3 is an enlarged cross-sectional view of the metering apparatus depicted in FIG. 1, taken along the section line III—III thereof.
FIG. 4 is a cross-sectional view of the metering apparatus depicted in FIG. 2, taken along the section line IV—IV thereof.
FIG. 4a is a fragmentary cross-sectional view of a detail of the metering apparatus depicted in FIG. 4, showing a few of the lamellae or foils of the cell wheel outwardly biased by a resilient element, here a spring.

In the schematic cross-sectional view of the metering apparatus 100 depicted in FIG. 3, there has been particularly depicted the power or force transmission from the sprocket wheel 14, which is driven by the sprocket chain 13 and the electric motor or drive unit 11 and, in turn, connected with a drive sleeve or bushing 25. The eccentric sleeve 9 of the drum member 1 and the eccentric sleeve 10 of the cell wheel 38 are arranged internally of this drive sleeve or bushing 25. The eccentric sleeve 10 of the cell wheel 38 has a polygonal internal crosssection provided with slide surfaces 26 and 27 situated substantially normal or perpendicular to one another. The slide sleeve or bushing 15 can slide within the eccentric sleeve 10 of the cell wheel 38 along the slide surfaces 26, whereas in a direction normal thereto there are present gaps or spaces for the free mobility.

A shaft member 28 of the cell wheel 38, which defines the lengthwise axis 30 thereof, can slide in vertical or elevational direction in the slide sleeve 15 and is arranged internally of such slide sleeve 15. The lengthwise axes 29 and 30 of the drum member 1 and the cell wheel 38, respectively, can be moved relative to one another in vertical or elevational direction. Upon driving the sprocket wheel 14 in the direction a (FIG. 3), the force transmission is accomplished by means of the slide surfaces 26 and 27 and the drive sleeve 25 to the drum member 1 and the cell wheel 38, respectively, so that notwithstanding the eccentric arrangement of both of these cylindrical components there can occur a positive uniform drive with the same rotational speed.

The function of the metering apparatus 100 for the metering or apportionment of material masses will be particularly understood in conjunction with the schematic sectional showing of FIG. 4. The container or housing 4 comprises an inlet or delivery component or section 31 provided with a distributor chamber or space 32 serving for the substantially uniform infeed of the material mass to be metered or apportioned into the container 4. This delivery component or section 31 is advantageously releasably connected with the container 4 for replacement by a different delivery component or section. The drum member 1, which is rotatable about the lengthwise axis 29, is sealed by sealing or seal members 33 and 34 carried by the container 4 at the region of the depicted end regions or ends 112 thereof. Due to the possibility of displacing the container 4, as previously explained, it is therefore possible to also positionally displace the sealing or seal members 33 and 34 in relation to the drum member 1, especially in the circumferential direction thereof. The sealing or seal member 33 comprises a sealing ledge or element 35 resiliently held against the drum member 1 by springs or resilient elements 36 defining a resilient surface.

At the side 114 where the drum member 1 enters into the container 4, there is provided a suitable sealing or seal element 37a which may be a sealing ledge or labyrinth seal 37 and which, as shown, here tangentially contacts the drum member 1. This sealing ledge or labyrinth seal 37 is likewise retained by springs 36, defining a resilient surface, against the drum member 1. As the material for forming the sealing ledge or labyrinth seal 37 there can be advantageously used plastic materials having a low coefficient of friction, such as, for example, polytetrafluoroethylene, polypropylene, polyethylene and the like.

As previously explained, the cell wheel 38 is arranged within the drum member 1 for rotation about the lengthwise axis 30 of such cell wheel 38. As will be seen by inspecting FIGS. 4 and 4a, within radial slots or grooves 104 of this cell wheel 38 there are movably arranged lamellae or foils 39 or equivalent structure, which are biased by resilient elements, such as springs 106 against a substantially cylindrical inner wall 108 of the drum member 1. These radial or radially extending slots 104 of the cell wheel 38 preferably extend in the direction of generatrixes of such cell wheel 38. The lengthwise axis 29 of the drum member 1 and the lengthwise axis 30 of the cell wheel 38 are positioned above one another in a vertical or elevational plane. If the drum member 1 and the cell wheel 38 are placed into rotation in the direction of rotation a, then at the region between a sealing line or edge 40 and apex 41 of the container 1 the material mass located in the container 1 is sucked-up, whereas in the region between the apex 41 and sealing line or edge 42 the material mass sucked-up by the cell wheel 38 through the openings or perforations 2 is again delivered via such openings or perforations 2 into the container 4. If the assembly composed of the cell wheel 38 and the drum member 1 departs from the sealing line or edge 42, then the material mass between two neighboring lamellae or foils 39 leaves the space or cell 118 situated between such two neighboring lamellae or foils 39 and the drum member 1 and is pressed-out or extruded through the openings or perforations 2. This pressing-out operation continues up to the lowest point of the drum member 1.

During the further rotational movement, there again takes place a sucking-up action, so that there cannot occur any post-dripping of the material mass, such as a pasty material mass out of the drum member 1. The size of the droplets or globules of the material mass pressed out of the drum member 1 can be controlled by shifting the lengthwise axis 29 of the drum member 1 and the lengthwise axis 30 of the cell wheel 38 relative to one another. A further possibility exists by upwardly shifting the sealing line or edge along the rotating drum member 1, so that the pressed-out or extruded material mass cannot be pressed back again into the container 1, rather already causes droplet formation. Such shifting or displacement of the container 1 can be accomplished, as considered with reference to FIG. 1, by a pivotal movement, or else by performing a parallel displacement in vertical direction.

Figure 5:
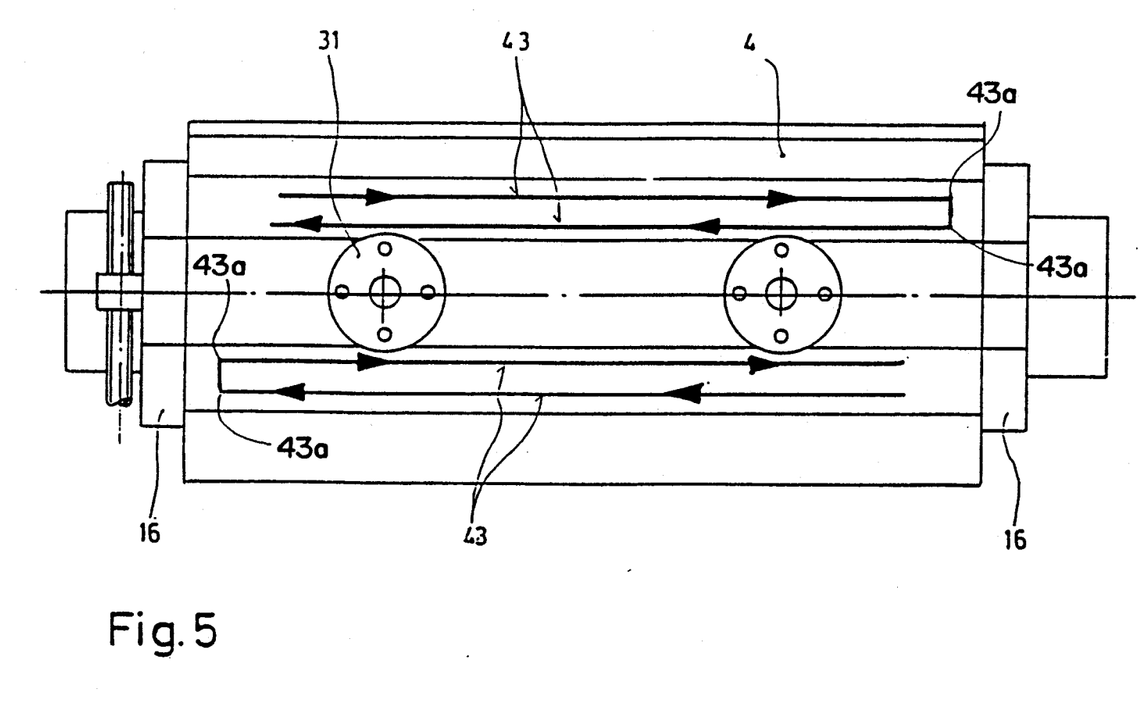
FIG. 5 is a schematic top plan view, partially in a transparent showing of the container or housing of the metering apparatus for the material mass to be pressed out or extruded in order to reveal internal structure.

With further reference to FIG. 4, the velocity v of the transport belt or band 3 is coordinated to the rotational speed or velocity of the drum member 1 rotating in the rotational direction a, so that the horizontal velocity component of the downwardly dripping material mass corresponds to the travel velocity v of the transport belt or band 3. As a result, there is possible deposition of the material mass droplets or globules in a desired geometric configuration upon the transport belt or band 3. Moreover, it is here pointed out that both the container 4 and the cell wheel 38 can be provided with bores 43 and 44, respectively, extending in axial direction. These bores 43 and 44 serve for the infeed of a suitable tempering or heat-exchange medium, especially a heating medium. Such bores 43 and 44, as particularly conveniently indicated in FIG. 5 for the bores 43, are connected in pairs at their ends 43a with one another, so that the medium can be infed through one of the bores and again can be outfed by an adjacently situated bore out of the shell or jacket of the container 4. A corresponding arrangement can be likewise provided for the bores 44 of the cell wheel 38. Furthermore, there can be provided the same number of bores 43 and 44 for the container 4 and the cell wheel 38, respectively, and such bores 43 and 44 each can possess substantially the same cross-sectional area.

While there are shown and described present preferred embodiments of the invention, it is distinctly to be understood the invention is not limited thereto, but may be otherwise variously embodied and practiced within the scope of the following claims.

What is claimed is:

1. An apparatus for the metered dosing of fluent material masses, comprising:
   a drum member having a substantially horizontal lengthwise axis and rotatable about the substantially horizontal lengthwise axis;
   the drum member comprising a substantially cylindrical outer shell provided with a plurality of openings;
   the substantially cylindrical outer shell of the drum member having an inner surface;
   a roller member having a lengthwise axis rotatably arranged within the drum member;
   the lengthwise axis of the roller member and the lengthwise axis of the drum member being arranged substantially parallel and eccentric to one another;

a transport device for receiving metered material mass portions of the processed material mass arranged beneath the drum member;

the roller member comprising a cell wheel provided with lamellae retained against the inner surface of the substantially cylindrical outer shell, to form a cell through a region of travel throughout the rotation of the cell wheel, prior to the metered dosing of the fluent material mass; and a container for the material mass partially encircling the drum member while leaving free a lower region.

2. The apparatus according to claim 1, wherein:
the transport device comprises a transport belt upon which the metered material mass portions can solidify in the form of material mass droplets.

3. The apparatus according to claim 1, further including:
means for moving the lengthwise axis of the cell wheel defined by the roller member and the lengthwise axis of the drum member relative to one another.

4. The apparatus according to claim 1, wherein:
the inner surface of the substantially cylindrical outer shell of the drum member having a substantially cylindrical configuration.

5. The apparatus according to claim 1, wherein:
the container has a lengthwise axis; and
means for varying in substantially vertical direction the distance between the lengthwise axis of the drum member and the lengthwise axis of the container.

6. The apparatus according to claim 1, further including:
means for varying in substantially vertical direction the distance between the lengthwise axis of the drum member and the lengthwise axis of the cell wheel.

7. The apparatus according to claim 1, further including:
eccentric sleeve means for mounting the drum member.

8. The apparatus according to claim 1, further including:
eccentric sleeve means for mounting the cell wheel.

9. The apparatus according to claim 1, further including:
eccentric sleeve means for mounting the drum member and eccentric sleeve means for mounting the cell wheel.

10. The apparatus according to claim 9, wherein:
the eccentric sleeve means of the cell wheel are mounted within the eccentric sleeve means of the drum member.

11. The apparatus according to claim 10, wherein:
the eccentric sleeve means of the cell wheel and the eccentric sleeve means of the drum member are arranged externally of the drum member.

12. The apparatus according to claim 10, wherein:
the eccentric sleeve means of the cell wheel and the eccentric sleeve means of the drum member are arranged externally of the container.

13. The apparatus according to claim 1, further including:
seal means for sealing the container in relation to the drum member.

14. The apparatus according to claim 13, wherein:
the container has opposite end regions; and
the seal means for sealing the container in relation to the drum member comprises a respective sealing ledge arranged at each opposite end region of the container.

15. The apparatus according to claim 1, wherein:
each two neighboring lamellae of the cell wheel enclose a space therebetween in conjunction with the drum member;
each said space increasing and decreasing in volume during rotation of the cell wheel and the drum member at respective regions within the container; and
means for altering the size of the space between each two neighboring lamellae at the respective regions within the container.

16. The apparatus according to claim 15, further including:
means for displacing the container in substantially vertical direction.

17. The apparatus according to claim 1, further including:
a shaft defining the lengthwise axis of the cell wheel; and
said shaft being provided with bore extending in axial direction of the shaft and through which flows a tempering fluid medium.

18. The apparatus according to claim 17, wherein:
the tempering fluid medium comprises a heating medium.

19. The apparatus according to claim 1 wherein:
the container comprises means for the throughflow of a tempering fluid medium.

20. The apparatus according to claim 19, wherein:
the means for the throughflow of the tempering fluid medium comprise bores through which flows the tempering fluid medium.

21. The apparatus according to claim 20, wherein:
the bores through which flows the tempering fluid medium are interconnected at least at one respective end thereof for fluid flow communication with one another.

22. The apparatus according to claim 1, further including:
common drive means for conjointly driving the cell wheel and the drum member at substantially the same rotational speed.

23. The apparatus according to claim 22, further including:
the common drive means comprises a drive motor for the cell wheel;
a slide sleeve for coupling the drive motor of the cell wheel with the drum member; and
said slide sleeve enabling movement of the lengthwise axis of the cell wheel and the lengthwise axis of the drum member along slide surfaces disposed substantially normal to one another.

24. The apparatus according to claim 1, wherein:
the container has oppositely situated end regions; and
labyrinth seal means for sealing the oppositely situated end regions of the container with respect to the drum member.

25. The apparatus according to claim 1, further including:
means defining a distributor chamber for the material mass provided for the container.

26. The apparatus according to claim 25, wherein:

the means defining the distributor chamber comprises a component releasably connected with the container.

27. An apparatus for the metered dosing of fluent material masses, comprising:
   a drum member having a lengthwise axis and rotatable about said lengthwise axis;
   the drum member comprising a substantially cylindrical outer shell provided with a plurality of openings;
   the substantially cylindrical outer shell of the drum member having an inner surface;
   a cell wheel having a lengthwise axis rotatably arranged within the drum member;
   the lengthwise axis of the cell wheel and the lengthwise axis of the drum member being arranged substantially parallel and eccentric to one another;
   a transport device for receiving metered material mass portions of the processed material mass arranged beneath the drum member;
   the cell wheel being provided with lamellae radially movable with respect to the cell wheel; and
   a container for the material mass partially encircling the drum member while leaving free a lower region.

28. An apparatus for the metered dosing of fluent material masses, comprising:
   a drum member having a lengthwise axis and rotatable about said lengthwise axis;
   the drum member comprising a substantially cylindrical outer shell provided with a plurality of openings;
   the substantially cylindrical outer shell of the drum member having an inner surface;
   a cell wheel having a lengthwise axis rotatably arranged within the drum member;
   the lengthwise axis of the cell wheel and the lengthwise axis of the drum member being arranged substantially parallel and eccentric to one another;
   a transport device for receiving metered material mass portions of the processed material mass arranged beneath the drum member;
   the cell wheel being provided with lamellae retained against the inner surface of the substantially cylindrical outer shell, to form a cell through a region of travel throughout the inner surface of the drum member, prior to the metered dosing of the fluent material mass; and
   a container for the material mass partially encircling the drum member while leaving free a lower region.

29. An apparatus for the metered dosing of fluent material masses, comprising:
   a drum member having a substantially horizontal lengthwise axis and rotatable about the substantially horizontal lengthwise axis;
   the drum member comprising a substantially cylindrical outer shell provided with a plurality of openings;
   the substantially cylindrical outer shell of the drum member having an inner surface;
   a roller member having a lengthwise axis rotatably arranged within the drum member;
   the lengthwise axis of the roller member and the lengthwise axis of the drum member being arranged substantially parallel and eccentric to one another;
   a transport device for receiving metered material mass portions of the processed material mass arranged beneath the drum member;
   the roller member comprising a cell wheel provided with lamellae cooperating with the inner surface of the substantially cylindrical outer shell;
   a container for the material mass partially encircling the drum member while leaving free a lower region; and
   means for rotating the cell member and the drum member at the same rotational speed.

30. An apparatus for the metered dosing of fluent material masses, comprising:
   a drum member having a substantially horizontal lengthwise axis and rotatable about the substantially horizontal said lengthwise axis;
   the drum member comprising a substantially cylindrical outer shell provided with a plurality of openings;
   the substantially cylindrical outer shell of the drum member having an inner surface;
   a roller member having a lengthwise axis rotatably arranged within the drum member;
   the lengthwise axis of the roller member and the lengthwise axis of the drum member being arranged substantially parallel and eccentric to one another;
   a transport device for receiving metered material mass portions of the processed material mass arranged beneath the drum member;
   the roller member comprising a cell wheel provided with substantially radially extending slots in which lamellae are guided, said lamellae cooperating with the inner surface of the substantially cylindrical outer shell;
   a container for the material mass partially encircling the drum member while leaving free a lower region; and
   means for retaining the lamellae against the inner surface of the substantially cylindrical outer shell of the drum member.

31. The apparatus according to claim 30, wherein said retaining means comprises a spring.

32. The apparatus according to claim 30, wherein the radially extending slots of the cell wheel extend in the direction of generatrixes of the cell wheel.

33. An apparatus for the metered dosing of fluent material masses, comprising:
   a drum member having a substantially horizontal lengthwise axis and rotatable about the substantially horizontal lengthwise axis;
   the drum member comprising a substantially cylindrical outer shell provided with a plurality of openings;
   the substantially cylindrical outer shell of the drum member having an inner surface;
   a roller member having a lengthwise axis rotatably arranged within the drum member;
   the lengthwise axis of the roller member and the lengthwise axis of the drum member being arranged substantially parallel and eccentric to one another;
   a transport device for receiving metered material mass portions of the processed material mass arranged beneath the drum member;
   a container for the material mass partially encircling the drum member while leaving free a lower region;

the roller member comprising a cell wheel provided with lamellae cooperating with the inner surface of the substantially cylindrical outer shell, each two neighboring lamellae of the cell wheel enclosing a space therebetween in conjunction with the drum member, each said space increasing and decreasing in volume during rotation of the cell wheel and the drum member at respective regions within the container;

means for altering the size of the space between each two neighboring lamellae at the respective regions within the container; and means for pivoting the container about an axis which is substantially parallel to the lengthwise axis of the drum member.

34. An apparatus for the metered dosing of fluent material masses, comprising:
a drum member having a substantially horizontal lengthwise axis and rotatable about the substantially horizontal lengthwise axis;
the drum member comprising a substantially cylindrical outer shell provided with a plurality of openings;
the substantially cylindrical outer shell of the drum member having an inner surface;
a roller member having a lengthwise axis rotatably arranged within the drum member;
the lengthwise axis of the roller member and the lengthwise axis of the drum member being arranged substantially parallel and eccentric to one another;
a transport device for receiving metered material mass portions of the processed material mass arranged beneath the drum member;
the roller member comprising a cell wheel provided with lamellae cooperating with the inner surface of the substantially cylindrical outer shell;
a container for the material mass partially encircling the drum member while leaving free a lower region; and
means for sealing the container in relation to the drum member; and
means for displacing the seal means in circumferential direction of the drum member.

35. An apparatus for the metered dosing of fluent material masses, comprising:
a drum member having a substantially horizontal lengthwise axis and rotatable about the substantially horizontal lengthwise axis, the drum member comprising a substantially cylindrical outer shell provided with a plurality of openings, the drum member having a predetermined direction of rotation, and an entry region into the container as viewed with respect to the predetermined direction of rotation of the drum member;
the substantially cylindrical outer shell of the drum member having an inner surface;
a roller member having a lengthwise axis rotatably arranged within the drum member;
the lengthwise axis of the roller member and the lengthwise axis of the drum member being arranged substantially parallel and eccentric to one another;
a transport device for receiving metered material mass portions of the processed material mass arranged beneath the drum member;
the roller member comprising a cell wheel provided with lamellae cooperating with the inner surface of the substantially cylindrical outer shell;
a container for the material mass partially encircling the drum member while leaving free a lower region;
means defining a resilient surface; and
a seal arranged at the entry region of the rotating drum member into the container and which bears, under the action of the resilient surface, at the drum member.

36. An apparatus for the metered dosing of fluent material masses, comprising:
a drum member having a substantially horizontal lengthwise axis and rotatable about the substantially horizontal lengthwise axis;
the drum member comprising a substantially cylindrical outer shell provided with a plurality of openings;
the substantially cylindrical outer shell of the drum member having an inner surface;
a roller member having a lengthwise axis rotatably arranged within the drum member;
the lengthwise axis of the roller member and the lengthwise axis of the drum member being arranged substantially parallel and eccentric to one another;
a transport device for receiving metered material mass portions of the processed material mass arranged beneath the drum member;
the roller member comprising a cell wheel provided with lamellae cooperating with the inner surface of the substantially cylindrical outer shell, and bores for the throughflow of a tempering fluid medium; and
a container for the material mass partially encircling the drum member while leaving free a lower region, the container comprises bores for the throughflow of a tempering fluid medium, the number of bores of the container being equal to the number of bores of the cell wheel.

37. The apparatus according to claim 36, wherein the bores of the container and the bores of the cell wheel possess substantially the same cross-sectional area.

* * * * *